(12) United States Patent
Zink et al.

(10) Patent No.: US 6,789,821 B2
(45) Date of Patent: Sep. 14, 2004

(54) METHOD AND APPARATUS FOR FOLDING AN AIRBAG

(75) Inventors: Daniel Zink, Glashütten (DE); Ralph Mohr, Hofheim (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 179 days.

(21) Appl. No.: 10/212,800

(22) Filed: Aug. 7, 2002

(65) Prior Publication Data
US 2003/0116950 A1 Jun. 26, 2003

(30) Foreign Application Priority Data
Dec. 21, 2001 (DE) .......................................... 101 63 447

(51) Int. Cl.[7] .............................................. B60R 21/16
(52) U.S. Cl. ..................... 280/743.1; 493/451; 493/459; 53/429
(58) Field of Search ..................... 280/743.1; 493/231, 493/243, 405, 407, 458, 459, 451; 53/429

(56) References Cited

U.S. PATENT DOCUMENTS

| | | | |
|---|---|---|---|
| 5,375,393 A | 12/1994 | Baker et al. ................... 53/429 |
| 5,456,651 A | 10/1995 | Baker et al. ................. 493/405 |
| 5,612,035 A | * 3/1997 | Howell et al. ............ 424/185.1 |
| 5,669,204 A | 9/1997 | Blaisdell ....................... 53/429 |
| 5,746,690 A | * 5/1998 | Humbarger et al. ......... 493/405 |
| 5,803,483 A | * 9/1998 | Lunt ........................ 280/728.1 |
| 5,868,660 A | * 2/1999 | Yokoyama ................... 493/405 |
| 6,250,675 B1 | * 6/2001 | Dietsch et al. ............ 280/743.1 |
| 6,432,033 B1 | * 8/2002 | Salzmann et al. ........... 493/231 |

* cited by examiner

Primary Examiner—Paul N. Dickson
Assistant Examiner—Toan C To
(74) Attorney, Agent, or Firm—Lonnie Drayer

(57) ABSTRACT

An airbag is pushed in portions by at least one slide means into at least one compartment in order to generate the folding. So that even complex folds are possible using a relatively simple apparatus, in accordance with the invention the airbag is arranged on the apparatus with a first portion in a substantially vertical position, and a second portion of the airbag is pushed into a compartment, during which the second portion is pre-tensioned by the weight of the first portion in front of the associated slide means. Further provided is pushing the airbag in a first direction into at least one first compartment and pushing in a second direction into at least one second compartment, this second direction being directed at an angle in relation to the first direction.

18 Claims, 2 Drawing Sheets

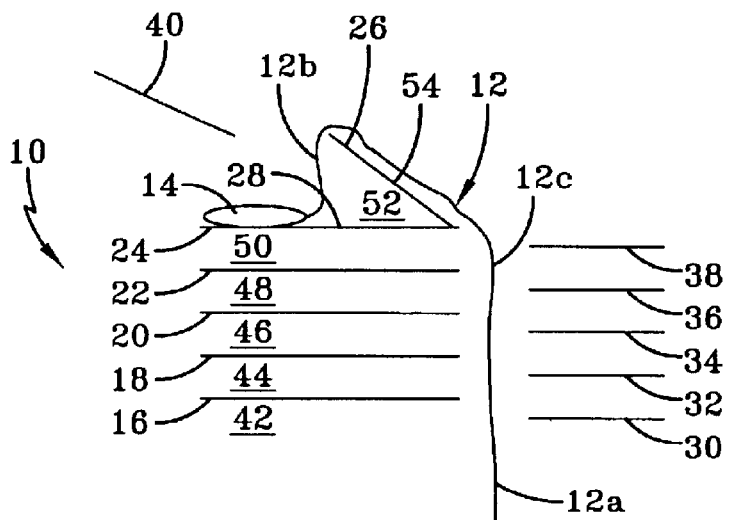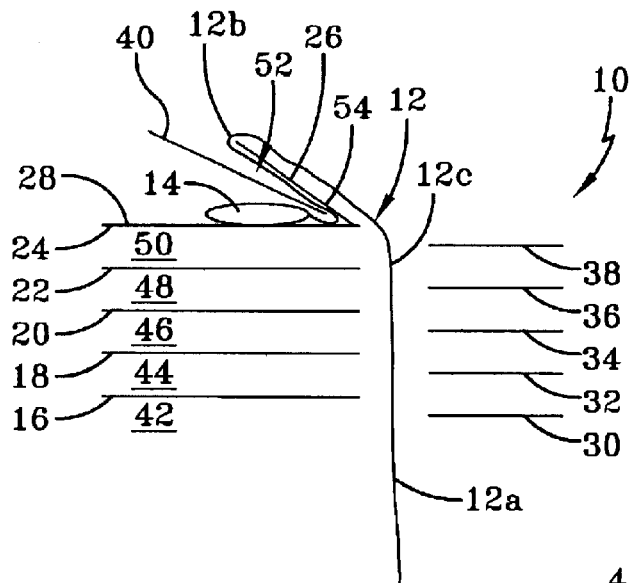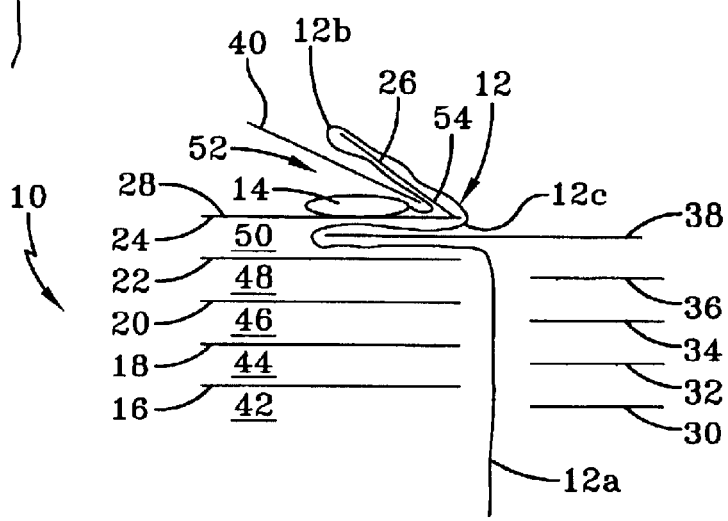

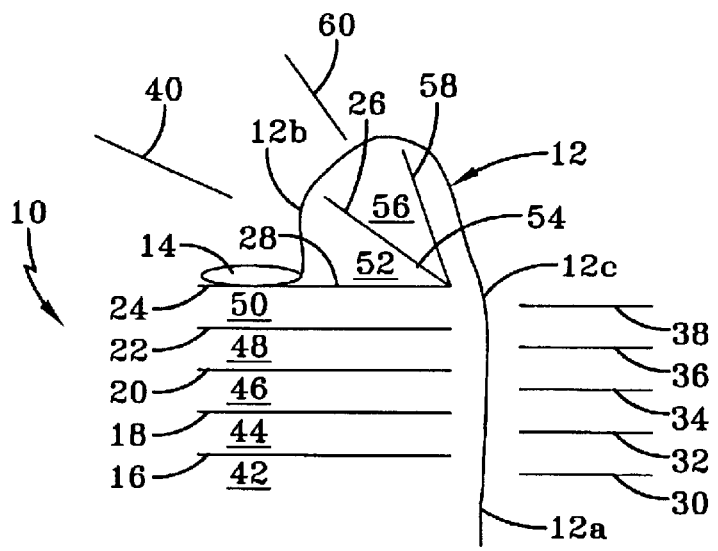
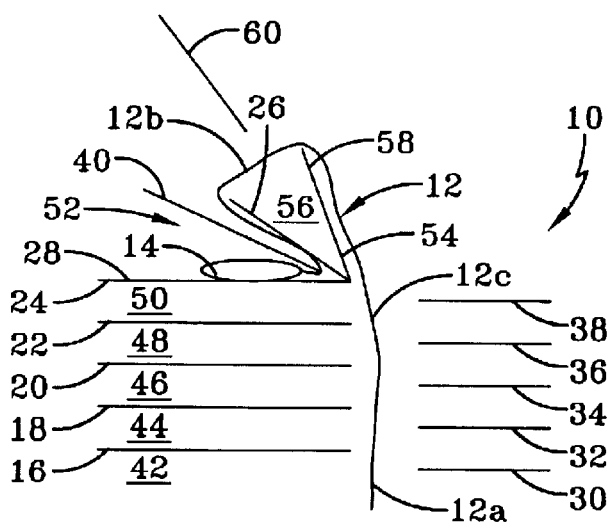
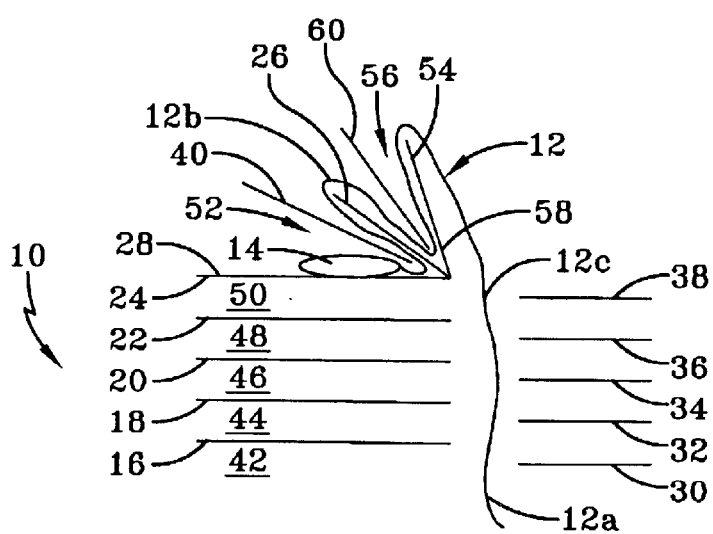

METHOD AND APPARATUS FOR FOLDING AN AIRBAG

FIELD OF THE INVENTION

The present invention relates to a method and an apparatus for folding an airbag that is a component of an airbag module.

DISCUSSION OF THE PRIOR ART

U.S. Pat. No. 5,375,393 discloses a method and an apparatus for folding an airbag of an airbag module, in which the airbag to be folded is to be spread out on a platform through which compartment walls can be moved perpendicularly upwards from below. The airbag then lies on the upper ends of the compartment walls, and upright slide means can be pushed into it from above in order to generate the folding. The folded airbag is grasped by a gripper at its outer bag layers, the compartment walls and slide means are withdrawn, and the folded airbag is then turned with the aid of the gripper in order to deposit it in a housing of the airbag module. The method necessitates a relatively complex apparatus for folding and is suitable substantially only for folding the airbag of a driver or passenger airbag module.

U.S. Pat. No. 5,669,204 discloses a method and an apparatus for folding an airbag of an airbag module, in which the airbag is also arranged horizontally. The airbag is guided on a flat, horizontally arranged holding arm. For folding, first the holding arm is withdrawn from the airbag and compartment walls are extended below the airbag vertically from below. Slide means are pushed into these compartment walls vertically from above in order to fold the horizontally placed airbag in portions. Once folding is complete, the airbag is methoded further with the aid of a gripper. The required folding apparatus is again relatively complex, and in particular the threading of the airbag onto the horizontally arranged holding arm is complex.

SUMMARY OF THE INVENTION

The present invention provides a method and an apparatus for folding an airbag of an airbag module, in particular a curtain airbag module, in which the apparatus can be of relatively simple construction and at the same time even complex folding can be performed. The apparatuses used hitherto for folding an airbag of an airbag module, with the airbag to be spread out horizontally and the compartment walls and slide means moving vertically, do have certain advantages, at the same time they have certain weak points which can be avoided by an appropriate re-working of the shape of the folding apparatus.

According to the invention, the airbag to be arranged on the apparatus or spread out is arranged with a first portion in a substantially vertical position. This means that the airbag is, at least in part, no longer deposited horizontally on a platform but is arranged for example hanging. This novel type of arrangement of an airbag has the result that when a second portion of the airbag is pushed into a compartment in front of the associated slide means, this second portion is pre-tensioned by the weight of the first, hanging portion.

In the case of conventional folding apparatuses, the airbag is arranged horizontally, with a first portion sliding on a platform or a holding arm and with only the friction of the airbag on the platform or holding-arm surface acting on it in order to slightly pre-tension a second portion of the airbag to be pushed in. According to the invention, by contrast, the entire weight of a first portion of the airbag is used to generate the desired pre-tension. Thus, the apparatus according to the invention can be used to avoid deviations and undesirable transverse folds in the folding to be brought about. Moreover, it is particularly simple to arrange an airbag in a substantially vertical position. Thus, with the method according to the invention, complex laying out of the airbag to be folded on a platform is dispensed with.

BRIEF DESCRIPTION OF THE DRAWINGS

FIG. 1 is a side view of a first exemplary embodiment of an apparatus according to the present invention in a first operational position.

FIG. 2 is a side view of the exemplary apparatus in accordance with FIG. 1 in a second operational position.

FIG. 3 is a side view of the exemplary apparatus in accordance with FIG. 1 in a third operational position.

FIG. 4 is a side view of a second exemplary embodiment of an apparatus according to the present invention in a first operational position.

FIG. 5 is a side view of the exemplary apparatus in accordance with FIG. 4 in a second operational position.

FIG. 6 is a side view of the exemplary apparatus in accordance with FIG. 4 in a third operational position.

DETAILED DESCRIPTION OF THE INVENTION

FIG. 1 illustrates the basic structure of an apparatus 10 for folding an airbag 12 that is a component of a curtain airbag module. With a curtain airbag module of this kind, a gas supply device 14 in the form of a gas supply hose is arranged on a longitudinal side of the airbag 12. The apparatus 10 has a total of six compartment walls 16–26, of which the compartment walls 16–24 are arranged substantially horizontally and are constructed uniformly spaced from one another. From the topmost compartment wall 24, a compartment wall 26 projects away, directed obliquely upwards. The compartment wall 26 is connected to the right-hand longitudinal border of the compartment wall 24 at its lower longitudinal border, in relation to FIG. 1. The compartment walls 16–26 extend in the direction of view over the entire length of an airbag 12 when the latter is arranged on the apparatus 10.

In order to fold the airbag 12 and the associated gas supply device 14, the compartment wall 24 forms, at its upper side in front of and below the obliquely directed compartment wall 26, a substantially horizontal support 28 for the gas supply device 14 and the region of the airbag 12 connected thereto. The region of the airbag 12 adjoining the gas supply device 14 is laid over the obliquely directed compartment wall 26 onto the apparatus 10 and hangs down in front of the horizontal compartment walls 16–24 by a first portion 12a which extends as far as the lower border of the airbag 12.

Six slide means 30–40 are furthermore provided on the apparatus 10, of which five slide means 30–38 extend in a horizontal arrangement in the operational position illustrated in FIG. 1, in front of the compartment walls 16–24. The slide means 30–38 can be pushed into the compartments 42–50 formed by the compartment walls 16–24. A further compartment 52 is formed by the topmost compartment wall 24 and the obliquely directed compartment wall 26, and the slide means 40 is arranged obliquely in front of this further compartment 52.

While the slide means 30–38 are moved substantially horizontally to the left, in relation to FIG. 1, in order to slide into the compartments 42–50, the slide means 40 can be moved in a direction which is directed at an angle of approximately 160° to the direction of movement of the slide means 30–38. Accordingly, the slide means 30 is moved downwards and to the right into the compartment 52, in relation to FIG. 1.

This movement of the slide means 40 is illustrated in FIGS. 1 and 2 in connection with an airbag 12 laid thereon. When the slide means 40 moves, the gas supply device 14 is moved along the substantially horizontal support 28 in the direction of the compartment wall 26 and hence is drawn into the top compartment 52. At the same time a second portion 12b of the airbag 12 which is located in front of the slide means 40 is pre-tensioned by the first portion 12a of the airbag 12, which is lying on the oblique compartment wall 26 and hangs down in a vertical position in front of the compartments 42–50.

The effect of pre-tensioning a second portion of the airbag, desired in accordance with the invention, in front of a slide means by the weight of a first portion of the airbag arranged in a substantially vertical position is particularly pronounced if the first portion is arranged on the apparatus as far as the outer border of the airbag in a substantially vertical position. In this form, an airbag can also be arranged manually or indeed mechanically on the apparatus using particularly few operational steps. The first portion merely has to be laid against an edge of the apparatus and then hangs down vertically as far as the outer border of the airbag. When the second portion of the airbag is pushed into a compartment, the first portion slides over the edge on the apparatus. Alternatively or in addition, an airbag hanging down vertically or obliquely may also be pushed directly into compartments arranged horizontally or correspondingly obliquely without in so doing sliding over an edge.

As the slide means 40 is pushed in, the second portion 12b of the airbag 12 slides over a sliding surface 54 made on the upper side of the compartment wall 26, while the second portion 12b is pushed into the compartment 52 in front of the slide means 40, in the form of a fold.

The sliding surface 54 can be of rough construction so that the gas supply device 14 will not be drawn out of the compartment 52 by the first portion 12a of the airbag 12 if the slide means 40 were retracted into its starting position illustrated in FIG. 1.

Following the pushing of the slide means 40 into the top compartment 52, the remaining region of the airbag 12 is pushed into the compartments 42–50 in successive steps or at the same time, using all the slide means 30–38. On each pushing in, a portion 12c of the airbag 12, here in its turn designated a "second" portion, is located in front of the corresponding slide means, for example in FIG. 3 the slide means 38, and is pre-tensioned in front of the slide means 38 by the first portion 12a of the airbag 12 hanging down vertically. When this second portion 12c of the airbag 12 is pushed into the compartment 50, the first portion 12a of the airbag which is hanging down slides upwards and, by its weight, pre-tensions the second portion 12c. The method is repeatedly analogously with the slide means 36–30, so that the whole airbag 12 is pushed into the compartments 50–42, in the form of a fold.

The compartment walls 16–26 and the slide means 30–40 could be drawn out of the airbag 12 folded in this way in the direction of view in FIGS. 1 to 3 in order to insert the folded airbag 12 into a sheath (not illustrated) to make a packed curtain airbag module.

Alternatively, or in addition, in the present method and apparatus for folding an airbag of an airbag module, the airbag is pushed in a first direction into at least one first compartment and furthermore the airbag is pushed in a second direction into at least one second compartment, this second direction being directed at an angle in relation to the first direction, in particular an angle of 90° to 180°. Accordingly, in accordance with the invention it is furthermore proposed that the slide means used in the apparatus are not all moved in one and the same direction but are deliberately directed in different directions in order to use them to move the airbag in portions into associated compartments. With known apparatuses, up until now only compartment walls were moved in the opposite direction of movement to the associated slide means. According to the invention, by contrast, slide means are intended to move from different directions into compartments positioned against the airbag.

In an advantageous further development of the invention, it is provided for the airbag to be pushed in a first direction into at least one compartment on one side of a gas supply device of the airbag module and to be pushed in, a second direction into at least one second compartment on the same side of the gas supply device, this second direction being directed at an angle of approximately 10° to 60°, in particular from 30° to 40°, in relation to the first direction. With this further development, therefore, at least two slide means directed at an angle act on the airbag. With this folding method, in particular individual folds can be arranged on one side of a gas supply device if further folds are to be formed on another side of the gas supply device.

It is furthermore advantageous to deflect the airbag on the apparatus between the first and second portions, for example with the aid of a sliding surface. The sliding surface can be formed by the above-mentioned edge on the apparatus. The airbag may in particular be deflected at an angle of approximately 360°, as a result of which folds are laid in two opposing regions of the airbag in a particularly simple manner.

FIGS. 4 to 6 illustrate a second embodiment of an apparatus 10 for folding an airbag 12 of a curtain airbag module. The apparatus 10 corresponds to the apparatus 10 illustrated in FIGS. 1 to 3 as regards the compartment walls 16–26, the support 28 and the slide means 30–40. Moreover, the apparatus 10 in accordance with FIGS. 4 to 6 is provided with a second oblique compartment 56 made above the first oblique compartment 52. This second oblique compartment 56 is delimited by the compartment wall 26 and a further compartment wall 58 that projects away obliquely upwards at an angle of approximately 80° from the right-hand border of the compartment wall 24 in relation to FIG. 4. In front of the compartment 56, a slide means 60 is directed at an angle spaced from the slide means 40 by approximately 40° and from the slide means 30–38 by approximately 120°.

With the aid of the slide means 60, a further fold can be made on the upper side of the gas supply device 14, in relation to FIG. 4, in the compartment 56. Moreover, a further five folds may be made with the aid of the slide means 30–38 and the associated compartments 42–50 on the opposing, lower side of the gas supply device 14 in relation to FIG. 4, in the same way as with the apparatus 10 according to FIGS. 1 to 3.

In an embodiment of the apparatus 10 which is not illustrated, the compartment walls 26 and 58 are directed parallel to the compartment walls 16–24 form compartments 52 and 56 which are accessible to horizontally directed slide means 40 and 60 from the left, on the upper side of the gas supply device 14 in relation to FIG. 4. With this construction, or indeed in combination with the oblique compartment walls 26 and 58 illustrated in FIGS. 1 to 6, it is also possible for more than two compartments to be constructed and hence more than two folds to be formed on the upper side of the gas supply device 14 in relation to the figures.

The apparatus according to the invention may be further developed in particular using simple means such that the airbag is pushed in a first direction into at least one compartment on one side of the gas supply device and is pushed in a third direction into at least one compartment on the side opposite the first side, this third direction being directed at an angle of at least 90° in relation to the first direction. In this way, folds may be laid on two sides of a gas supply device without a rotary gripper, for example, being required. This apparatus is particularly suitable, too, for arranging individual layers of an airbag on one side of a gas supply hose on a curtain airbag module and for arranging further layers on the opposing side of the gas supply hose.

Finally, it should be noted that the angles specified here relate to angles as measured along the plane of the drawing in FIGS. 1 to 6.

The present invention makes numerous novel ways of folding an airbag of an airbag module possible, without complex folding apparatuses then being required. According to the invention, in particular the compartment walls of the individual compartments may also be directed at angles to one another. In that case the compartment walls no longer extend parallel to one another, as is the case with conventional folding apparatuses.

The present method and apparatus for folding an airbag of an airbag module are particularly suitable for folding the airbag of a curtain airbag module that may subsequently be installed in a ceiling of a motor vehicle. In the inflated condition, the airbag of a curtain airbag module of this kind conventionally extends inside a motor vehicle, from the roof pillar, parallel to the vehicle side.

Moreover, the invention generally provides the precondition for providing the airbag of an airbag module with a number of different types of fold, without a complex folding apparatus then being required.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

We claim:

1. A method of folding an airbag that is a component of an airbag module comprising the steps of:
   providing an apparatus capable of pushing an airbag in portions by at least one slide means into at least one compartment to fold the airbag;
   arranging the airbag on the apparatus with a first portion of the airbag in a substantially vertical position;
   pushing a second portion of the airbag into said compartment of said apparatus, during which pushing the second portion of the airbag is pre-tensioned by the weight of the first portion of the airbag in front of the associated slide means; and
   pushing the airbag in a first direction into at least one compartment on one side of a gas supply device of an airbag module, and pushing the airbag in a second direction into at least one second compartment on the same side of the gas supply device, this second direction being directed at an angle of approximately 10° to 60° in relation to the first direction.

2. The method of folding an airbag that is a component of an airbag module according to claim 1, further comprising the step of arranging the first portion of the airbag as far as the outer border of the airbag in a substantially vertical position.

3. The method of folding an airbag that is a component of an airbag module according to claim 2,
   wherein the second direction is directed at an angle of approximately 30° to 40° in relation to the first direction.

4. The method of folding an airbag that is a component of an airbag module according to claim 1,
   wherein the second direction is directed at an angle of approximately 30° to 40° in relation to the first direction.

5. The method of folding an airbag that is a component of an airbag module according to claim 1, further comprising the step of: deflecting the airbag on the apparatus between the first and second portions.

6. The method of folding an airbag that is a component of an airbag module according to claim 5 wherein the airbag is pushed in a first direction into at least one compartment on one side of the gas supply device, and pushing the airbag in a third direction into at least one compartment on the side opposite the first side, this third direction being directed at an angle of at least 90° in relation to the first direction.

7. The method of folding an airbag that is a component of an airbag module according to claim 6,
   wherein the second direction is directed at an angle of approximately 30° to 40° in relation to the first direction.

8. A method for folding an airbag that is a component of an airbag module comprising the steps of:
   providing an apparatus capable of pushing an airbag in portions by at least one slide means into at least one compartment to fold the airbag;
   pushing a first portion of the airbag using the at least one slide means in a first direction into at least one first compartment on one side of a gas supply device of an airbag module;
   pushing a second portion of the airbag in a second direction into at least one second compartment on the same side of the gas supply device, this second direction being directed at an angle in relation to the first direction in the range of 10° to 60°;
   deflecting the airbag on the a apparatus between the first and second portions; and
   pushing the airbag in a third direction into at least one compartment on the side opposite the first side, this third direction being directed at an angle of at least 90° in relation to the first direction.

9. The method of folding an airbag that is a component of an airbag module according to claim 8,
   wherein the second direction is directed at an angle of approximately 30° to 40° in relation to the first direction.

10. An apparatus for folding an airbag that is a component of an airbag module, in which the airbag is to be pushed in portions by at least one slide means into at least one compartment on a first side of a gas supply device of the airbag module and the airbag is to be pushed in a second direction into at least one second compartment on the same side of the gas supply device, this second direction being directed at an angle of approximately 10° to 60° in relation to the first direction in order to generate the folding, the airbag is to be arranged on the apparatus with a first portion of the airbag in a substantially vertical position, and a second portion of the airbag is to be pushed into a compartment, during which the second portion of the airbag is pretensioned by the weight of the first portion of the airbag in front of the associated slide means.

11. The apparatus for folding an airbag that is a component of an airbag module according to claim 10, wherein the first portion of the airbag is to be arranged as far as the outer border of the airbag in a substantially vertical position.

12. The apparatus for folding an airbag that is a component of an airbag module according to claim 10, wherein the second direction is directed at an angle of approximately 30° to 40° in relation to the first direction.

13. The apparatus for folding an airbag that is a component of an airbag module according to claim 10, wherein a deflection device for the airbag is provided between the first and the second portions.

14. The apparatus for folding an airbag that is a component of an airbag module according to claim 10, wherein the airbag is to be pushed in a third direction into at least one compartment on a side of the gas supply device opposite the first side, this third direction being directed at an angle of at least 90° in relation to the first direction.

15. An apparatus for folding an airbag that is a component of an airbag module, in which the airbag is to be pushed in portions by at least one slide means into at least one compartment in order to folding the airbag, the airbag is to be pushed in a first direction into at least one first compartment located on a first side of a gas supply device of the airbag module and the airbag is to be pushed in a second direction into at least one second compartment on the same side of the gas supply device, this second direction being directed at an angle in relation to the first direction of approximately 10° to 60°.

16. The apparatus for folding an airbag that is a component of an airbag module according to claim 15, wherein the second direction is directed at an angle of approximately 30° to 40° in relation to the first direction.

17. The apparatus for folding an airbag that is a component of an airbag module according to one claim 15, wherein a deflection device for the airbag is provided between the first and the second portions.

18. The apparatus for folding an airbag that is a component of an airbag module according to claim 15, wherein the airbag is to be pushed in a third direction into at least one compartment on a side of the gas supply device opposite the first side, this third direction being directed at an angle of at least 90° in relation to the first direction.

* * * * *